(12) United States Patent
Heinemann et al.

(10) Patent No.: US 11,585,678 B2
(45) Date of Patent: Feb. 21, 2023

(54) SCANNING ELEMENT AND INDUCTIVE POSITION MEASURING DEVICE HAVING A SCANNING ELEMENT

(71) Applicant: DR. JOHANNES HEIDENHAIN GmbH, Traunreut (DE)

(72) Inventors: Christoph Heinemann, Übersee (DE); Martin Heumann, Traunstein (DE); Marc Oliver Tiemann, Waging am See (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 17/545,185

(22) Filed: Dec. 8, 2021

(65) Prior Publication Data

US 2022/0178673 A1 Jun. 9, 2022

(30) Foreign Application Priority Data

Dec. 8, 2020 (EP) ..................................... 20212350

(51) Int. Cl.
*G01D 5/20* (2006.01)
*G01B 7/00* (2006.01)
*G01B 7/30* (2006.01)

(52) U.S. Cl.
CPC ........... *G01D 5/2053* (2013.01); *G01B 7/003* (2013.01); *G01B 7/30* (2013.01); *G01D 2205/50* (2021.05)

(58) Field of Classification Search
CPC . G01B 7/003; G01B 7/30; G01D 5/20; G01D 5/204; G01D 5/2053; G01D 5/2073; G01D 5/2086; G01D 5/2225; G01D 5/2275; G01D 5/24438; G01D 2205/50
See application file for complete search history.

(56) References Cited

U.S. PATENT DOCUMENTS

| 7,277,267 B1* | 10/2007 | Bonin | G01D 5/2417 361/290 |
| 2017/0227380 A1* | 8/2017 | Musha | G01D 5/2006 |
| 2017/0276518 A1* | 9/2017 | Kimata | G01D 5/2073 |
| 2018/0195880 A1* | 7/2018 | Cook | G01B 3/004 |
| 2019/0310148 A1* | 10/2019 | Bertin | G01L 3/105 |

(Continued)

FOREIGN PATENT DOCUMENTS

| DE | 102018107416 A1 | 10/2019 |
| EP | 2182329 A2 | 5/2010 |
| JP | 2006208239 A | 8/2006 |

*Primary Examiner* — Steven L Yeninas
(74) *Attorney, Agent, or Firm* — Carter, DeLuca & Farrell LLP (57) ABSTRACT

A scanning element includes a multilayer circuit board having a first detector unit arranged in a first layer and in a second layer. In addition, the circuit board has a second detector unit, which is arranged in a third layer and in a fourth layer, and a first shielding layer, which is arranged in a fifth layer. The circuit board moreover has a geometrical center plane, which is located between the detector units, and furthermore has vias, which are arranged at an offset from one another in a direction parallel to the center plane. The fifth layer is structured such that that a web that is electrically insulated with respect to this first shielding layer is arranged next to the first shielding layer, the web being electrically contacted with the vias and electrically connecting the vias to one another.

22 Claims, 7 Drawing Sheets

(56) References Cited

U.S. PATENT DOCUMENTS

| | | | |
|---|---|---|---|
| 2020/0253525 A1* | 8/2020 | Zhang | H05K 1/111 |
| 2020/0306979 A1* | 10/2020 | Paulson | G01L 9/08 |
| 2021/0010793 A1 | 1/2021 | Irle et al. | |
| 2021/0010881 A1* | 1/2021 | Irle | G01B 7/30 |
| 2022/0065664 A1* | 3/2022 | Hristov | H01L 23/5225 |

* cited by examiner

SCANNING ELEMENT AND INDUCTIVE POSITION MEASURING DEVICE HAVING A SCANNING ELEMENT

CROSS-REFERENCE TO RELATED APPLICATIONS

The present application claims priority to Application No. 20212350.1, filed in the European Patent Office on Dec. 8, 2020, which is expressly incorporated herein in its entirety by reference thereto.

FIELD OF THE INVENTION

The present invention relates to a scanning element for an inductive position measuring device, e.g., for detecting a position of the scanning element relative to two scale elements that are rotatable at different speeds, and to a position measuring device having such a scanning element.

BACKGROUND INFORMATION

Inductive position measuring devices, for example, are used as angle encoders for determining the angular position of machine parts that are rotatable relative to one another. In inductive position measuring devices, excitation tracks and receiver tracks, such as in the form of conductor traces, are often mounted on a shared, usually multilayer circuit board, which is firmly connected to a stator of an angle encoder, for example. Situated opposite this circuit board is a scale element on which graduation structures are provided and which is connected to the rotor of the angle encoder in a torsionally fixed manner. When an electrical excitation current that varies over time is applied to the excitation tracks, signals that are a function of the angular position are generated in the receiver coils during the relative rotation between rotor and stator. These signals are then further processed in an evaluation electronics.

Inductive position measuring devices are frequently used especially in drives of robots as measuring devices for determining the angular position of a drive shaft and simultaneously for the exact determination of the angular position of an output shaft, the movement of the drive shaft being introduced into the output shaft by a reduction gear. In this instance, angular positions or angular settings are measured with the aid of a scanning element which has a circuit board provided with corresponding detector units on both sides, so that the respective angular position of scale elements arranged in a rotatable manner on both sides of the circuit board is able to be determined.

BACKGROUND INFORMATION

Figure 6:
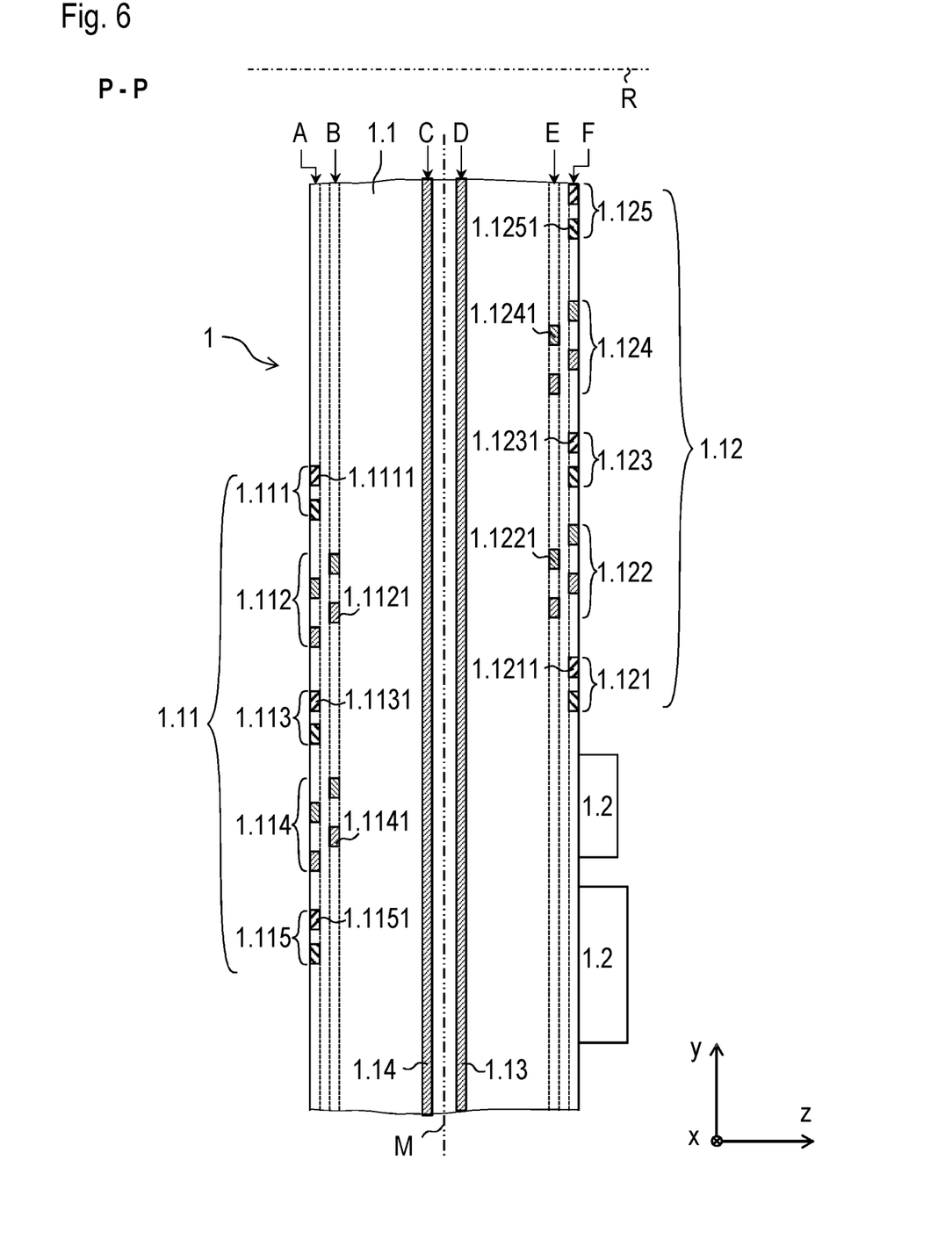
FIG. 6 is a cross-sectional view through the scanning element taken along line P-P.

Japanese Patent Document No. 2006-208239, for example, in FIG. 6, describes a position measuring device which has two rotors between which a stator is arranged. The position measuring device is used in a micrometer screw, for instance.

PCT Patent Document No. WO 2006/208239 describes a scanning element that has a transmission coil and sensor coils, which are arranged on a multilayer circuit board, the circuit board having layers that are arranged as shields.

SUMMARY

Example embodiments of the present invention provide a scanning element for an inductive position measuring device that is compact and able to be produced in an economical manner yet still operates relatively precisely and allows for the determination of positions or angular settings of two scale elements.

According to example embodiments of the present invention, a scanning element, which is adapted and intended for an inductive position measuring device, includes a multilayer circuit board having a first detector unit, a second detector unit, and a first shielding layer. The first detector unit is arranged in a first layer and in a second layer of the circuit board. The second detector unit is arranged in a third layer and in a fourth layer of the circuit board. The first shielding layer is arranged in a fifth layer of the circuit board. In addition, the circuit board has a geometrical center plane, which is located between the detector units. The circuit board furthermore has vias which are arranged at an offset from one another in a direction that has a parallel orientation to the center plane. The fifth layer of the circuit board is structured such that a web that is electrically insulated with respect to the first shielding layer is arranged next to the first shielding layer. The web is in electrical contact with the vias so that web electrically connects the vias to one another.

The structuring of the first shielding layer may be accomplished by an etching process so that a web that is electrically insulated from the original layer is produced in the fifth layer. As an alternative, the shielding layer is able to be produced by an additive method so that a structured layer of the circuit board is ultimately obtained via this route.

The detector units may have at least one excitation track, the at least one excitation track having at least one excitation conductor trace, and at least one of the vias being electrically connected to the excitation conductor trace.

The scanning element may be configured such that the first detector unit has a first excitation track and a first receiver track, and the second detector unit has a second excitation track and a second receiver track. For example, the first excitation track and the second excitation track may be electrically connected in series. The first receiver track and the second receiver track may be arranged circumferentially around an axis in the circumferential direction. The first receiver track includes first receiver conductor traces and the second receiver track includes second receiver conductor traces. These receiver conductor traces have a periodic characteristic in each case.

A first direction x may represent, for example, the particular direction in which the desired position is measured (measuring direction). Since the position measuring device is to measure a first relative angular position between the first scale element and the scanning element and at the same time a second angular position between the second scale element and the scanning element in relation to a rotary or pivot motion about an axis (of rotation) in each case, the first direction x is a circumferential direction or a tangential direction.

In addition, a second direction y may have an orthogonal extension with respect to first direction x.

A third direction z is, for example, oriented orthogonal to first direction x and simultaneously orthogonal to second direction y. Third direction z extends parallel to the axis (of rotation) about which a scale element is rotatable relative to the scanning element. In addition, third direction z has an orthogonal alignment to the center plane. The individual layers of the circuit board are arranged at an offset from one another in third direction z. The vias thus extend in or along third direction z. In addition, the vias are arranged at an offset from one another in first direction x and/or in second direction y.

The two largest (outer) surfaces of a circuit board are, for example, oriented in parallel with one another. The center plane is arranged, for example, in the center between these circuit board surfaces, in parallel with the surfaces, so that the distance between a surface of the circuit board and the center plane, e.g., in third direction z, is of exactly the same size as the distance between the other surface of the circuit board and the center plane.

The first excitation track and the second excitation track may extend along the circumferential direction or along first direction x.

For example, the detector units have at least one receiver track, at least one of the receiver tracks has at least one receiver conductor trace, and at least one of the vias is electrically connected to the receiver conductor trace.

The scanning element may be configured so that the first detector unit has a first receiver track, and the second detector unit has a second receiver track, the first receiver track and the second receiver track extending along the circumferential direction or along first direction x, as also the first excitation track and the second excitation track.

The first receiver conductor traces may have a periodic characteristic having a first period length λ1, and the second receiver conductor traces may have a periodic characteristic having a second period length λ2. Second period length λ2, for example, is greater than or equal to first period length λ1 (e.g., λ2≥λ1).

For example, the web is surrounded by an electrically insulating gap and the circuit board includes a second shielding layer, which is located at an offset from the web in third direction z, which has an orthogonal orientation to the center plane and moreover is arranged so as to overlap with the gap. An electrically conductive layer thus is interrupted by the structuring of the fifth layer of the circuit board so that a gap, which has an electrically insulating effect, is provided in the electrically conductive layer.

The circuit board may include a second shielding layer which is arranged in a sixth layer of the circuit board, the geometrical center plane being arranged between the shielding layers.

The circuit board may have electronic components. For example, at least one of the electronic components may be part of a circuit for generating an excitation current, which is able to be fed into at least one of the excitation conductor traces via the web.

For example, the first excitation track and the second excitation track are able to be energized by an excitation current which, e.g., has a current intensity that varies over time (alternating current or mixed current). The excitation current can be generated with the aid of the electronic components, which means that its characteristic is able to be formed by the electronic components. Since a physical relationship exists between the current intensity and the voltage intensity, the same view may also be taken for the excitation voltage.

For example, at least one of the vias is configured as a blind via (electrically conductively coated blind hole) or as a buried via.

The electronic components may be arranged as part of an evaluation circuit in which signals that may be received from the at least one receiver conductor trace are able to be further processed. Especially the signals that are able to be generated by the first receiver track and the second receiver track may be further processed with the aid of the electronic components, which, for example, form an evaluation circuit.

The electronic components may thus be components of different electronic circuits or be assigned to different circuits. For example, certain electronic components may be components of the circuit for generating an excitation current, or further electronic components may be components of an additional circuit for the evaluation or further processing of signals.

The second detector unit and at least one of the electronic components may be provided on the same side of the circuit board. In such a configuration, the second detector unit and the electronic component are thus arranged in the same direction at an offset from the center plane so that the center plane is not located between the second detector unit and the electronic component.

According to an example embodiment of the present invention, an inductive position measuring device includes a scanning element as described herein, a first scale element, and a second scale element. The scale elements are located on both sides of the circuit board and are set apart in third direction z (orthogonal to the center plane).

The first scale element has, for example, a first diameter D1, and the second scale element has, for example, a second diameter d2, the first diameter D1 being greater than second diameter d2 (e.g., D1>d2).

Moreover, the scale elements may be arranged so as to be rotatable about a shared axis relative to the scanning element.

For example, the first detector unit has a third receiver track, and the second detector unit has a fourth receiver track. The third receiver track may include third receiver conductor traces, the third receiver conductor traces having a periodic characteristic and the period length of the third receiver conductor traces being smaller than first period length λ1 of the first receiver conductor traces. In addition, the fourth receiver track may include fourth receiver conductor traces, the fourth receiver conductor traces having a periodic characteristic, and the period length of the fourth receiver conductor traces being greater than the second period length λ2 of the second receiver conductor traces.

The first detector unit may have a third excitation track, and the second detector unit may have a fourth excitation track.

In relation to third direction z, the center plane is located between the first detector unit and the first shielding layer. The center plane is located between the second detector unit and the second shielding layer in relation to third direction z, and the second detector unit and the second shielding layer are arranged on both sides of the center plane.

In addition, at least one of the electronic components may be arranged at a greater distance from the axis than the outer contour of the second scale element. In other words, the at least one electronic component is located radially outside the second scale element.

Further features and aspects of example embodiments of the present invention are described in more detail below with reference to the appended schematic Figures.

DETAILED DESCRIPTION

Figure 1:
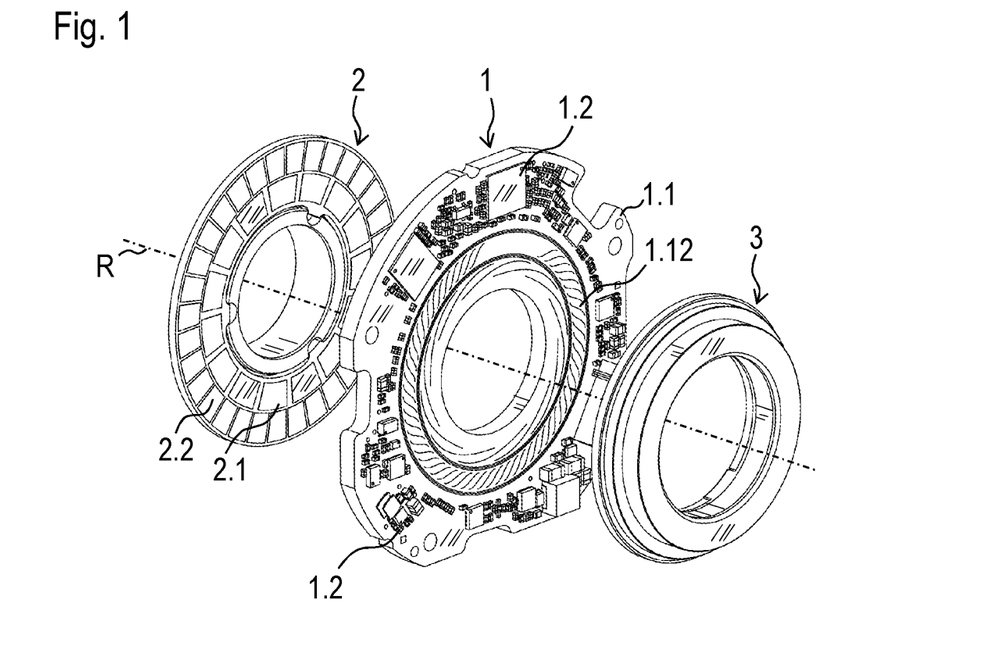
FIG. 1 is a perspective view of a position measuring device including a scanning element, a first scale element, and a second scale element.

Example embodiments of the present invention are described, for example, with reference to FIG. 1 based on a position measuring device provided with a scanning element 1, which is able to be used both for acquiring an angular position of a first scale element 2 and an angular position of a second scale element 3. Both scale elements 2, 3 are arranged so as to be rotatable about an axis R relative to scanning element 1. Such a position measuring device may be used in a drive device of a robot, for example. Second scale element 3, for example, is connected to a drive shaft of a motor in a torsionally fixed manner. The drive shaft in turn is connected to a reduction gear that has an output shaft. First scale element 2 rotates with this output shaft. In this manner, an angular position for a commutation of the motor, for example, is able to be performed with the aid of second scale element 3, and a comparatively highly precise angular position for positioning the robot may be achieved with the aid of first scale element 2.

Scanning element 1 includes a circuit board 1.1, which has multiple layers, and also has electronic components 1.2 which are mounted on circuit board 1.1. Scanning element 1 is used for scanning first scale element 2 and simultaneously for scanning second scale element 3. In the illustrated example embodiment, electronic components 1.2 are mounted only on the second side. Alternatively or additionally, however, it is also possible to mount electronic components on the first side of circuit board 1.1.

A first detector unit 1.11 is arranged on a first side of circuit board 1.1 in order to determine the angle information, and a second detector unit 1.12 is arranged on a second side of circuit board 1.1. FIG. 1 illustrates only the particular structures of second detector unit 1.12 that are arranged on an outer fourth layer F (see, e.g., FIGS. 6 and 9).

Figure 2:
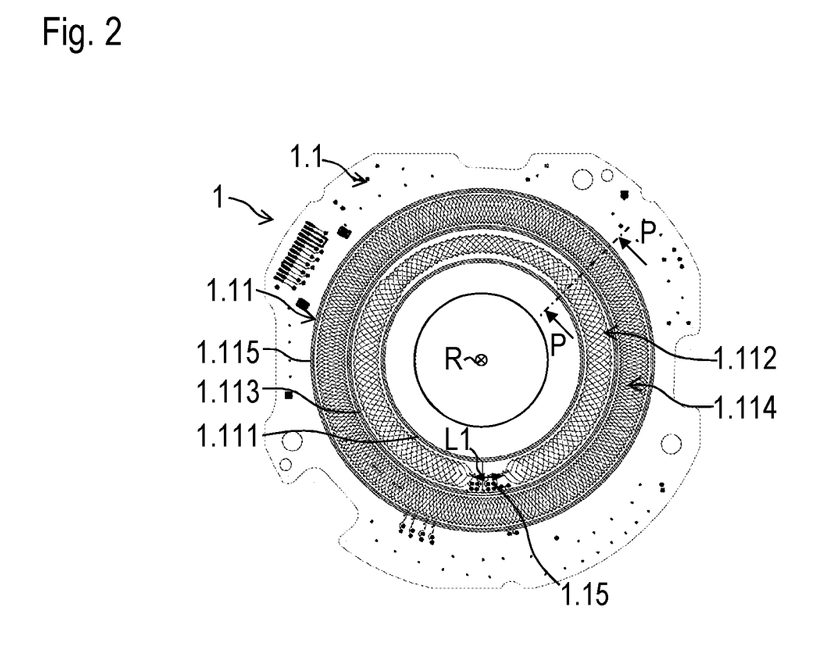
FIG. 2 is a top view of a first side of the scanning element.
Figure 3:
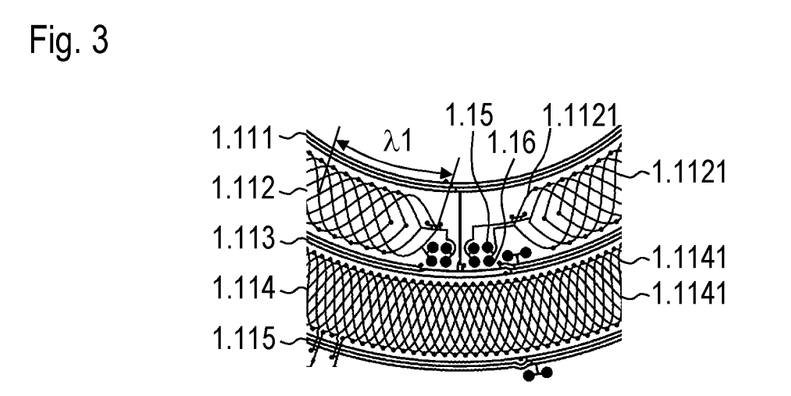
FIG. 3 is an enlarged view of the first side of the scanning element.

FIGS. 2 and 3 (e.g., FIG. 3 is an enlarged detail view of first detector unit 1.11 illustrated in FIG. 2), for example, show the particular structures of first detector unit 1.11 that are arranged in an outer first layer A of circuit board 1.1 and in a second layer B of circuit board 1.1. First detector unit 1.11 includes a first excitation track 1.111, a first receiver track 1.112, a third excitation track 1.113, a third receiver track 1.114, and a fifth excitation track 1.115. First receiver track 1.112 includes first receiver conductor traces 1.1121.

Figure 4:
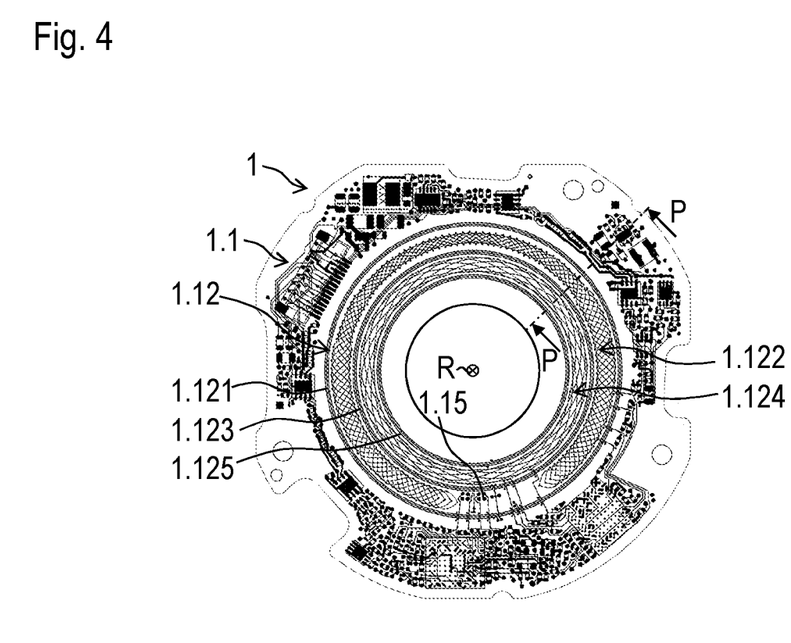
FIG. 4 is a top view of a second side of the scanning element.
Figure 5:
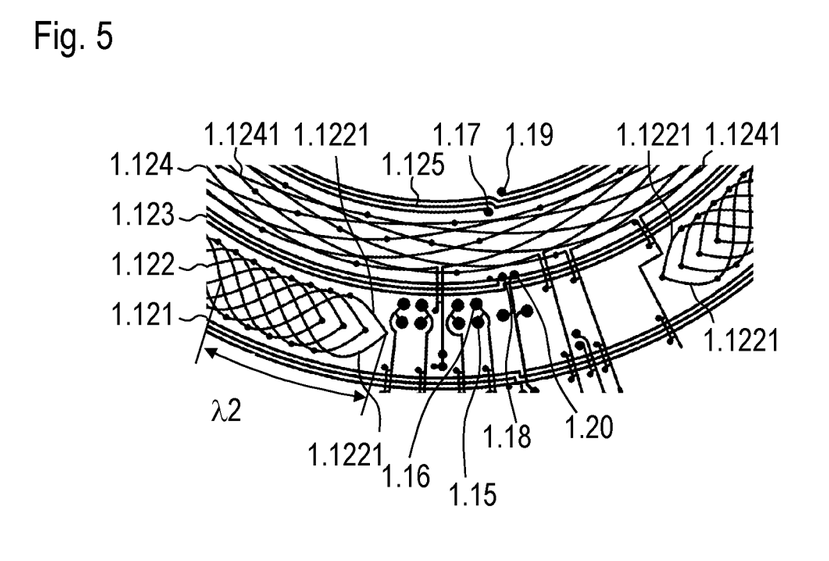
FIG. 5 is an enlarged view of the second side of the scanning element.

FIGS. 4 and 5 illustrate circuit board 1.1 from the other side so that second detector unit 1.12 can be seen. FIG. 5 is an enlarged view of second detector unit 1.12. FIGS. 4 and 5 illustrate, for example, the particular structures of second detector unit 1.12 that are arranged in the outer fourth layer F of circuit board 1.1 and in a third layer E of circuit board 1.1. Second detector unit 1.12 includes a second excitation track 1.121, a second receiver track 1.122, a fourth excitation track 1.123, a fourth receiver track 1.124, and a sixth excitation track 1.125. Second receiver track 1.122 includes second receiver conductor traces 1.1221.

FIG. 6 is a schematic, partial cross-sectional view taken along line P-P through scanning element 1 or circuit board 1.1. Cross-hatching of electrically insulating material of circuit board 1.1 is omitted for clarity. Moreover, it should be understood that FIG. 6 is not drawn to scale for a better understanding of scanning element 1. As mentioned above, circuit board 1.1 includes multiple layers. From a geometrical standpoint, a center plane M is defined for circuit board 1.1, which is located centrically between the first and second side in parallel with the first side and in parallel with the second side of circuit board 1.1. In addition, the geometrical relationships of the individual elements relative to one another are able to be defined with the aid of a coordinate system. A first direction x is the particular direction along which an intended position or angle measurement is to take place. In the illustrated example embodiment, first direction x corresponds to the circumferential direction. Axis R about which scale elements 2, 3 are rotatable extends in parallel with a third direction z so that third direction z may thus also be defined as the axial direction in this context. A second direction y, which may also be denoted as the radial direction, has an orthogonal orientation with respect to third direction z and first direction x. Thus, a plane that is defined by the x and y axis is oriented parallel to center plane M, and third direction z as well as axis R have an orthogonal extension with respect to center plane M.

Arranged in first layer A of circuit board 1.1 and in second layer B of circuit board 1.1 is first detector unit 1.11, while second detector unit 1.12 is arranged in third layer E and in fourth layer F. First layer A is located closest to the first side of circuit board 1.1 while second layer B is located second-closest to the first side of circuit board 1.1. The same applies to fourth layer F and third layer E with respect to the second side of circuit board 1.1.

Excitation tracks 1.111, 1.113, 1.115 of first detector unit 1.11 include excitation conductor traces 1.1111, 1.1131, 1.1151, which extend in first layer A. In a similar manner, excitation tracks 1.121, 1.123, 1.125 of second detector unit 1.12 include excitation conductor traces 1.1211, 1.1231, 1.1251 which extend in fourth layer F.

In addition, circuit board 1.1 also includes a fifth layer D and a sixth layer C. Arranged in fifth layer D is a first shielding layer 1.13, and a second shielding layer 1.14 is arranged in sixth layer C. Shielding layers 1.13, 1.14 are, for example, copper layers that have a relatively large surface.

Excitation tracks 1.111, 1.113, 1.115 of first detector unit 1.11 enclose first excitation track 1.112 and third excitation track 1.114.

Excitation tracks 1.121, 1.123, 1.125 of second detector unit 1.12 enclose second receiver track 1.122 and fourth receiver track 1.124. Excitation tracks 1.111, 1.113, 1.115, 1.121, 1.123, 1.125 as well as receiver tracks 1.112, 1.114, 1.122, 1.124 extend along the circumferential direction or along first direction x.

In the illustrated example embodiment, each receiver track 1.112, 1.114, 1.122, 1.124 includes receiver conductor traces 1.1121, 1.1141, 1.1221, 1.1241, which are located at an offset in the circumferential direction so that they are able to supply four signals that are phase-shifted according to the offset. In the Figures, the particular receiver conductor traces 1.1121, 1.1141, 1.1221, 1.1241 that belong to one and the same receiver track 1.112, 1.114, 1.122, 1.124 are provided with only a single reference numeral. As a result, all receiver conductor traces 1.1121 of first receiver track 1.112, for example, are given only one reference numeral. Moreover, first receiver conductor traces 1.1121 of first detector unit 1.11, connected to vias, extend in different layers of circuit board 1.1. so that undesired short circuits at junction points are avoided. The same also applies to receiver conductor traces 1.1221, 1.1241 of second detector unit 1.12. Although each first and second receiver conductor trace 1.1121, 1.1221 includes many conductor sections that are distributed to two planes or layers and arranged next to one another, such a structure is denoted overall as one receiver conductor trace 1.1221, 1.1241.

Receiver conductor traces 1.1121, 1.1141, 1.1221, 1.1241 have a spatially periodic characteristic, which has a substantially sinusoidal or sine-shaped configuration. Receiver conductor traces 1.1121 of first receiver track 1.112 have a period length $\lambda 1$ (see, e.g., FIG. 3), while receiver conductor traces 1.1221 of second receiver track 1.122 have a period length $\lambda 2$ (see, e.g., FIG. 5). In the illustrated example embodiment, receiver conductor traces 1.1121, 1.1141, 1.1221, 1.1241 adjacent in a receiver track 1.112, 1.114, 1.122, 1.124 are arranged at an offset from one another by $\frac{1}{8}$ the full sine period (by $\lambda/4$ or 45° along the circumferential direction or first direction x). Receiver conductor traces 1.1121, 1.1141, 1.1221, 1.1241 are electrically connected so that on the one hand, they supply 0° and 90° signals and 45° and 135° signals on the other hand. From the 0° and 90° signals, a first position signal is able to be determined, and from the 45° and 135° signals, a second signal redundant with respect to the first position signal is able to be determined.

In the illustrated example embodiment, second period length $\lambda 2$ is greater than first period length $\lambda 1$.

In addition, circuit board 1.1 has plated through holes 1.15, 1.16 as illustrated in FIGS. 4 and 5. Plated through holes 1.15, 1.16 thus penetrate circuit board 1.1 across its entire thickness. With the aid of plated through hole 1.15, first receiver conductor traces 1.1121 of first receiver track 1.112 are electrically connected to an electronic component 1.2, which is arranged on the other side of center plane M. To this end, using a circuit board that extends in second layer B, an electrical contact to plated through hole 1.15 is established with a first receiver conductor trace 1.1121. Plated through hole 1.15 penetrates first shielding layer 1.13 and second shielding layer 1.14, shielding layers 1.13, 1.14 being structured such that they are not electrically connected to plated through hole 1.15. In third layer E, a contact is established to a circuit trace that extends in this layer, by which the contact to electronic component 1.2 is ultimately established together with a further plated through hole. Further plated through hole 1.16 connects first receiver conductor traces 1.1121 extending in second layer B to fourth layer F. An electrical contact to electronic component 1.2 is established via conductor traces.

First receiver track 1.112 is arranged so as to overlap with respect to second receiver track 1.122 in second direction y.

Figure 7:
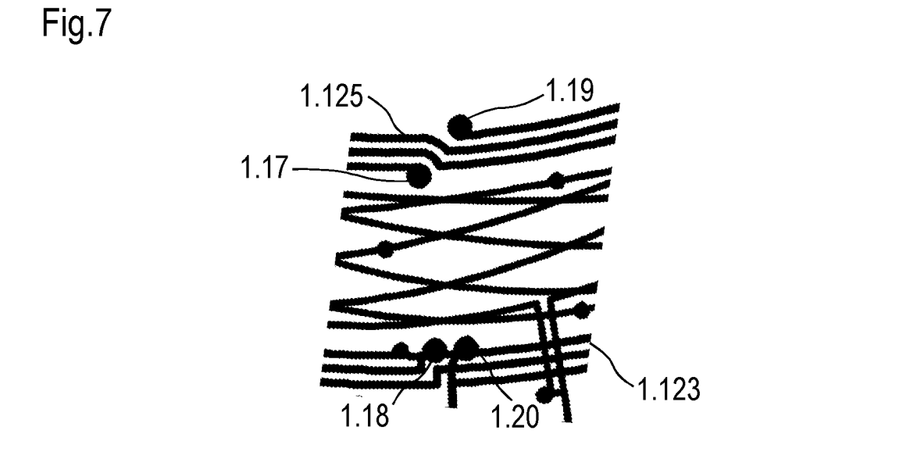
FIG. 7 further illustrates the second side of the scanning element.
Figure 8:
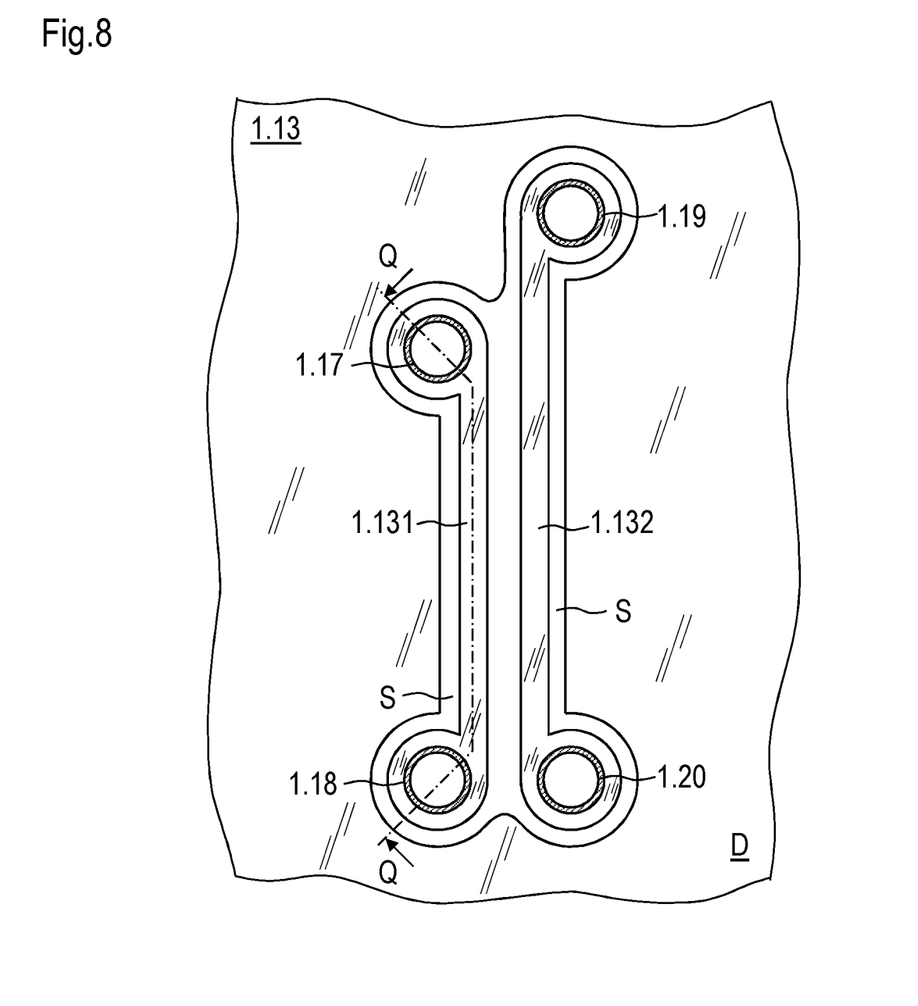
FIG. 8 is a top view of a fifth layer of the circuit board in a region in which vias are located.
Figure 9:
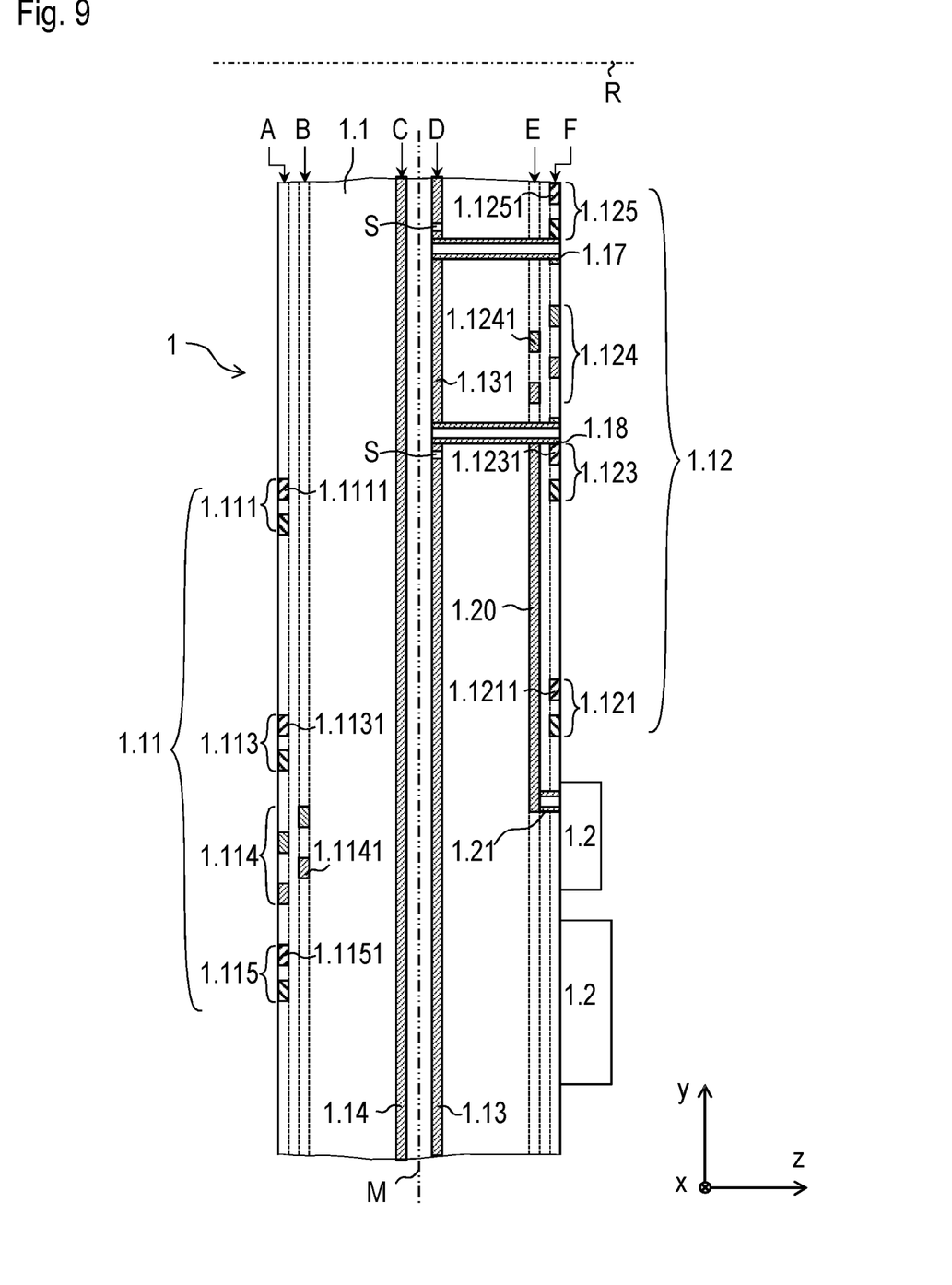
FIG. 9 is an enlarged cross-sectional view through the scanning element in the region of two vias.

As illustrated in FIGS. 7 to 9, sixth excitation track 1.125 is connected to the ends of vias 1.17, 1.19, and fourth excitation track 1.123 is connected to the ends of further vias 1.18, 1.20. Vias 1.17, 1.18, 1.19, 1.20 are arranged as blind vias and end in fifth layer D of circuit board 1.1. According to FIG. 8, fifth layer D, which originally was arranged as an uninterrupted copper layer, is structured such that webs 1.131, 1.132 are arranged in the x, y plane next to first shielding layer 1.13. By a gap S in which the material (such as copper, for example) of fifth layer D is removed, webs 1.131, 1.132 are electrically insulated with regard (or vis-à-vis) to first shielding layer 1.13. Since first web 1.131 is formed of an electrically conductive material, vias 1.17, 1.18 are thus electrically connected to one another by first web 1.131. The same applies to vias 1.19, 1.20 and second web 1.132. Alternatively, vias 1.17, 1.18, 1.19, 1.20 may be arranged as buried vias and establish a connection between fifth layer D and third layer E, the connection of fourth layer F to third layer E then being possible by additional micro vias.

FIG. 9 is a schematic, partial cross-sectional view taken along line Q-Q through scanning element 1 or through circuit board 1.1. Thus, the sectional line, for example, extends through vias 1.17, 1.18 and web 1.131. An electrical connection between fourth excitation track 1.123 and sixth excitation track 1.125 is established by such an arrangement.

Second shielding layer 1.14, which is located at an offset from first shielding layer 1.13 in the third direction, is uninterrupted at least in the near region of webs 1.131, 1.132, so that it is arranged in overlapping fashion with gap S. Because of this measure, the structuring of first shielding layer 1.13 does not result in any significant reduction of the shielding function of the two shielding layers 1.13, 1.14.

In addition, via 1.18 illustrated in FIG. 9 is connected by an electrically conductive layer 1.20 and a further plated through hole 1.21 to electronic component 1.2.

Figure 10:
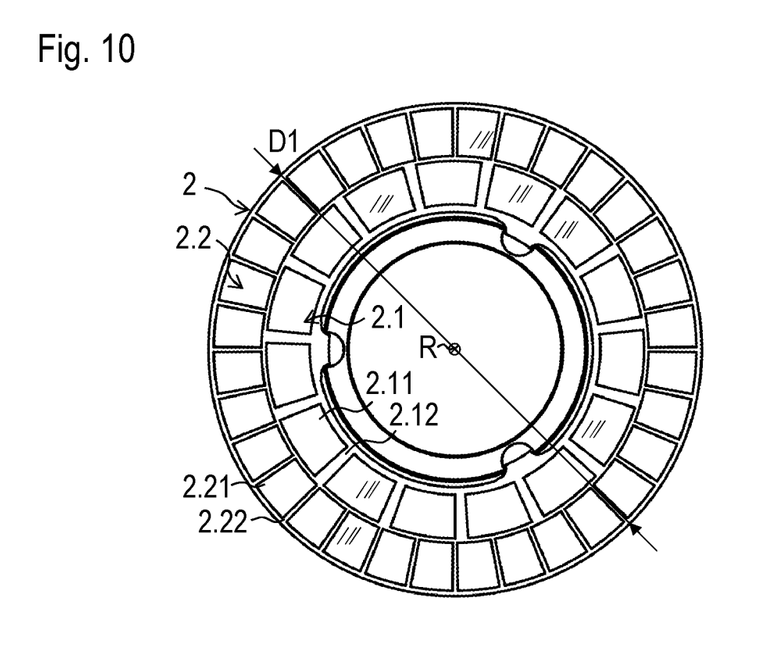
FIG. 10 is a top view of a first scale element.
Figure 11:
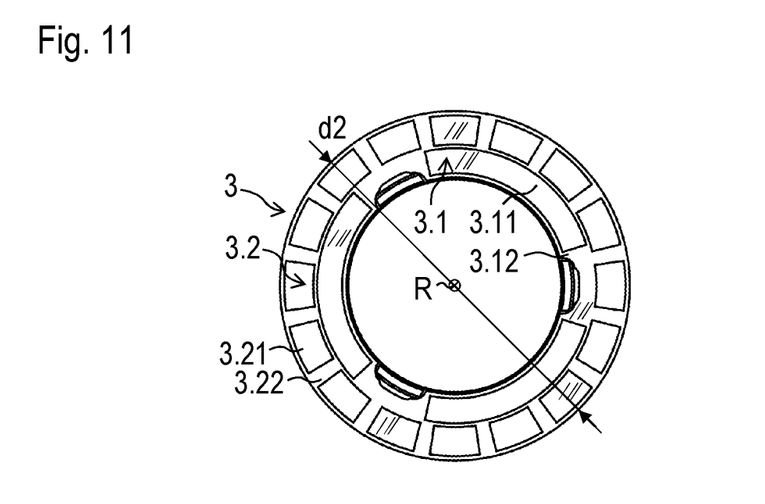
FIG. 11 is a top view of a second scale element.

FIG. 10 is a top view of a first scale element 2, and FIG. 11 is a top view of a second scale element 3. Scale elements 2, 3 have a disk-shaped configuration. First scale element 2 has a first diameter D1, and second scale element 3 has a second diameter d2. First diameter D1 is greater than second diameter d2 (e.g., D1>d2).

In the illustrated example embodiment, scale elements 2, 3 are made from a substrate that is produced from an epoxy resin and on which two graduation tracks 2.1, 2.2; 3.1, 3.2 are provided in each case. Graduation tracks 2.1, 2.2; 3.1, 3.2 have an annular configuration and are arranged on the substrate concentrically with respect to axis R and with different diameters. Graduation tracks 2.1, 2.2; 3.1, 3.2 include graduation structures that include a periodic sequence of alternatingly arranged electrically conductive graduation regions 2.11, 2.21; 3.11, 3.21 and non-conductive graduation regions 2.12, 2.22; 3.12, 3.22. In the illustrated example embodiment, copper is applied to the substrate as the material for the electrically conductive subregions 2.11, 2.21; 3.11, 3.21. In contrast, no coating is applied to the substrate in the non-conductive graduation regions 2.12, 2.22; 3.12, 3.22. Because of the arrangement featuring two graduation tracks 2.1, 2.2; 3.1, 3.2 in each case, the angular positions of scale elements 2, 3 are able to be determined in absolute terms. Outermost graduation track 2.2 of first scale element 2 has the largest number of graduation regions 2.21, 2.22 along a circumferential line, so that the greatest resolution with regard to the measurement of the angular position is achievable with its aid.

In the assembled state, according to FIG. 1, scanning element 1 and scale elements 2, 3 are located opposite each other with an axial clearance or air gap so that a relative rotation between scale elements 2, 3 and scanning element 1 is able to generate a signal in receiver conductor traces 1.1121, 1.1141, 1.1221, 1.1241 that is a function of the of the respective angular position with the aid of induction effects. A precondition for the generation of corresponding signals is that excitation conductor traces 1.1111, 1.1131, 1.1151, 1.1211, 1.1231, 1.1251 generate an electromagnetic excitation field that is variable in time in the region of the respectively scanned graduation structures. In the illustrated example embodiment, excitation conductor traces 1.1111, 1.1131, 1.1151, 1.1211, 1.1231, 1.1251 are arranged as a plurality of plane-parallel individual conductor traces that are traversed by a current. Scanning element 1 has an electronic circuit with electronic components 1.2, which are electrically connected to one another via layers E and F. The electronic circuit may also include an ASIC component, for example. This electronic circuit of scanning element 1 operates not only as an evaluation element but also as an excitation control element under whose control the excitation current is generated or produced, which flows through excitation conductor traces 1.1111, 1.1131, 1.1151, 1.1211, 1.1231, 1.1251. Excitation conductor traces 1.1111, 1.1131, 1.1151, 1.1211, 1.1231, 1.1251 thus are energized by one and the same excitation control element. First excitation track 1.111 and second excitation track 1.121 are electrically connected in series. The current supply is achieved starting from electronic component 1.2, which is part of a circuit for generating an excitation current, via plated through hole 1.21 to conductive layer 1.20 and via the two webs 1.131, 1.132 so that the excitation current is therefore conducted via these webs 1.131, 1.132. In this manner, the excitation current is able to be fed into excitation conductor traces 1.1211, 1.1231 via webs 1.131, 1.132.

When excitation tracks 1.111, 1.113, 1.115, 1.121, 1.123, 1.125 are energized, an electromagnetic field that is oriented in the shape of a tube or cylinder is generated around excitation conductor traces 1.111, 1.113, 1.115, 1.121, 1.123, 1.125. The field lines of the resulting electromagnetic field extend around excitation tracks 1.111, 1.113, 1.115, 1.121, 1.123, 1.125, the direction of the field lines depending on the current direction in excitation conductor traces 1.1111, 1.1131, 1.1151, 1.1211, 1.1231, 1.1251. Eddy currents are induced in the region of conductive subregions 2.11, 2.21; 3.11, 3.21 so that a modulation of the field as a function of the angular position is achieved. Receiver tracks 1.112, 1.114, 1.122, 1.124 in each case are thereby able to measure the relative angular position. The pairs of receiver conductor traces 1.1121, 1.1141, 1.1221, 1.1241 are arranged within their receiver track 1.112, 1.114, 1.122, 1.124 such that they supply signals that are offset in phase by 90° in each case, which means that a determination of the direction of rotation may be performed as well. The signals generated by receiver tracks 1.112, 1.114, 1.122, 1.124 are further processed with the aid of a few of electronic components 1.2, which form an evaluation circuit.

Because of first shielding layer 1.13 and second shielding layer 1.14, a negative influence on the two detector units 1.11, 1.12 on the measuring accuracy is largely preventable. Especially an impermissibly high measure of crosstalk signals is prevented, while excessive damping of the excitation fields is avoided at the same time. The electromagnetic interference of detector units 1.11, 1.12 due to electronic components 1.2 or due to external sources is inhibited in addition.

What is claimed is:

1. A scanning element for an inductive position measuring device, comprising:
    a multilayer circuit board including:
        a first detector unit arranged in a first layer and in a second layer;
        a second detector unit arranged in a third layer and in a fourth layer; and
        a first shielding layer arranged in a fifth layer;
        a geometrical center plane arranged between the detector units; and
        vias arranged at an offset from each other in a direction parallel to the center plane;
    wherein the fifth layer includes a web that is electrically insulated with respect to the first shielding layer and is arranged next to the first shielding layer, the web being electrically connected with the vias and electrically connecting the vias to each other.

2. The scanning element according to claim 1, wherein the detector units include at least one excitation track including at least one excitation conductor trace, at least one of the vias being electrically connected to the excitation conductor trace.

3. The scanning element according to claim 2, wherein the circuit board includes electronic components, at least one of the electronic components being part of a circuit adapted to generate an excitation current feedable into at least one of the excitation conductor traces via the web.

4. The scanning element according to claim 1, wherein each detector unit includes at least one receiver track, at least one of the receiver tracks including at least one receiver conductor trace, at least one of the vias being electrically connected to the receiver conductor trace.

5. The scanning element according to claim 4, wherein the circuit board includes electronic components arranged as part of an evaluation circuit adapted to further process signals generated by at least one of the receiver tracks.

6. The scanning element according to claim 1, wherein the web is surrounded by an electrically insulating gap, and the circuit board includes a second shielding layer that is arranged at an offset with respect to the web in a direction orthogonal to the center plane and overlaps the insulating gap.

7. The scanning element according to claim 1, wherein the circuit board includes a second shielding layer arranged in a sixth layer of the circuit board, the center plane being located between the first and second shielding layers.

8. The scanning element according to claim 1, wherein the circuit board includes electronic components.

9. The scanning element according to claim 8, wherein the electronic components are arranged as part of an evaluation circuit adapted to further process signals.

10. The scanning element according to claim 1, wherein at least one of the vias is arranged as a blind via or a buried via.

11. An inductive position measuring device, comprising:
    a first scale element;
    a second scale element; and
    a scanning element including:
        a multilayer circuit board including:
            a first detector unit arranged in a first layer and in a second layer;
            a second detector unit arranged in a third layer and in a fourth layer; and
            a first shielding layer arranged in a fifth layer;
            a geometrical center plane arranged between the detector units; and
            vias arranged at an offset from each other in a direction parallel to the center plane;
        wherein the fifth layer includes a web that is electrically insulated with respect to the first shielding layer and is arranged next to the first shielding layer, the web being electrically connected with the vias and electrically connecting the vias to each other; and
        wherein the scale elements arranged on both sides of the circuit board set apart in a third direction orthogonal to the center plane.

12. The inductive position measuring device according to claim 11, wherein the scale elements are adapted to rotate about a common axis relative to the scanning element.

13. The inductive position measuring device according to claim 11, wherein the first scale element has a first diameter, and the second scale element has a second diameter, the first diameter being greater than the second diameter.

14. The inductive position measuring device according to claim 11, wherein the detector units include at least one excitation track having at least one excitation conductor trace, at least one of the vias being electrically connected to the excitation conductor trace.

15. The inductive position measuring device according to claim 14, wherein the circuit board includes electronic components, at least one of the electronic components being part of a circuit adapted to generate an excitation current feedable into at least one of the excitation conductor traces via the web.

16. The inductive position measuring device according to claim 11, wherein each detector unit includes at least one receiver track, at least one of the receiver tracks including at least one receiver conductor trace, at least one of the vias being electrically connected to the receiver conductor trace.

17. The inductive position measuring device according to claim 16, wherein the circuit board includes electronic components arranged as part of an evaluation circuit adapted to further process signals generated by at least one of the receiver tracks.

18. The inductive position measuring device according to claim 11, wherein the web is surrounded by an electrically insulating gap, and the circuit board includes a second shielding layer that is arranged at an offset with respect to the web in a direction orthogonal to the center plane and overlaps the insulating gap.

19. The inductive position measuring device according to claim 11, wherein the circuit board includes a second shielding layer arranged in a sixth layer of the circuit board, the center plane being located between the first and second shielding layers.

20. The inductive position measuring device according to claim 11, wherein the circuit board includes electronic components.

21. The inductive position measuring device according to claim 20, wherein the electronic components are arranged as part of an evaluation circuit adapted to further process signals.

22. The inductive position measuring device according to claim 11, wherein at least one of the vias is arranged as a blind via or a buried via.

\* \* \* \* \*